(12) United States Patent
Lim

(10) Patent No.: US 9,246,421 B2
(45) Date of Patent: Jan. 26, 2016

(54) BOOTSTRAP CIRCUIT AND CONTROL SYSTEM FOR A POWER TOOL

(71) Applicant: Black & Decker Inc., Newark, DE (US)

(72) Inventor: Jongsoo Lim, Timonium, MD (US)

(73) Assignee: Black & Decker Inc., New Britain, CT (US)

( * ) Notice: Subject to any disclaimer, the term of this patent is extended or adjusted under 35 U.S.C. 154(b) by 46 days.

(21) Appl. No.: 14/094,160

(22) Filed: Dec. 2, 2013

(65) Prior Publication Data

US 2014/0103840 A1 Apr. 17, 2014

Related U.S. Application Data

(63) Continuation of application No. PCT/US2012/040720, filed on Jun. 4, 2012.

(60) Provisional application No. 61/492,514, filed on Jun. 2, 2011.

(51) Int. Cl.
*H02P 1/26* (2006.01)
*H02P 6/14* (2006.01)
*B25F 5/00* (2006.01)
*B25C 1/06* (2006.01)

(52) U.S. Cl.
CPC ... *H02P 6/14* (2013.01); *B25C 1/06* (2013.01); *B25F 5/00* (2013.01)

(58) Field of Classification Search
CPC ... H02M 1/08; H03K 17/063; H03K 17/6871; B25F 5/00
See application file for complete search history.

(56) References Cited

U.S. PATENT DOCUMENTS

| | | |
|---|---|---|
| 5,243,522 A | 9/1993 | Salzmann |
| 6,172,474 B1 | 1/2001 | Gotou |
| 7,064,517 B2 | 6/2006 | Kiuchi et al. |
| 7,684,217 B2 | 3/2010 | Nakata et al. |
| 7,692,474 B2 | 4/2010 | Stegmayr |
| 7,782,027 B2 | 8/2010 | Williams |
| 7,786,712 B2 | 8/2010 | Williams |
| 2010/0001675 A1 | 1/2010 | Matsunaga et al. |
| 2010/0237124 A1 | 9/2010 | Shima et al. |
| 2010/0308764 A1 | 12/2010 | Suzuki et al. |
| 2010/0314710 A1 | 12/2010 | Yamaji |
| 2011/0260707 A1* | 10/2011 | Imanishi et al. ............. 323/311 |

FOREIGN PATENT DOCUMENTS

| | | |
|---|---|---|
| JP | 62-230217 A | 10/1987 |
| JP | 09-037487 A | 2/1997 |
| JP | 2004201453 A | 7/2004 |

OTHER PUBLICATIONS

International Preliminary Report on Patentability.
European Search Report, The Hague Examiner Mario Garella Dec. 4, 2015.

* cited by examiner

*Primary Examiner* — Karen Masih
(74) *Attorney, Agent, or Firm* — Amir R. Rohani; Scott Markow

(57) ABSTRACT

An electronic circuit for a power tool includes a plurality of high-side and low-side switches connected in series between terminals of a power source and coupled to a load, a bootstrap circuit comprising a plurality of bootstrap capacitors arranged to provide sufficient amount of drive voltage to turn ON and OFF the plurality of high-side switches, and a control unit configured to turn ON and OFF the plurality of low-side switches in succession to sequentially charge the bootstrap capacitors.

20 Claims, 9 Drawing Sheets

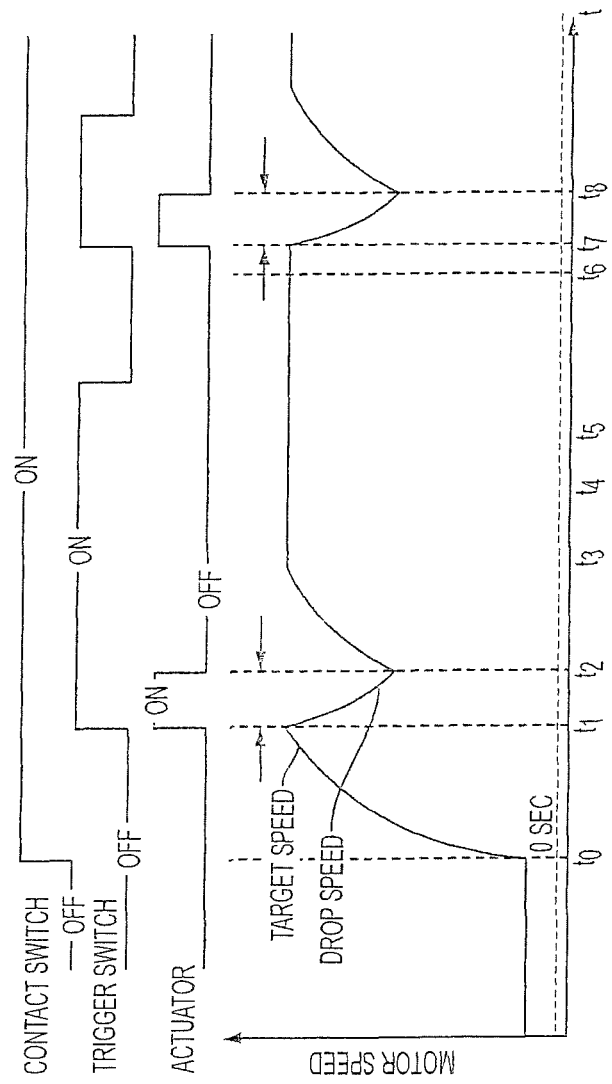

US 9,246,421 B2

BOOTSTRAP CIRCUIT AND CONTROL SYSTEM FOR A POWER TOOL

CROSS-REFERENCE TO RELATED APPLICATION(S)

This application is a continuation of PCT Application No. PCT/US2012/040720 filed Jun. 4, 2012, which claims the benefit of U.S. Provisional Application No. 61/492,514 filed Jun. 2, 2011. Contents of both applications are incorporated herein by reference in their entireties.

FIELD OF THE INVENTION

The present invention relates to power tools, and more particularly to a controls and electronics features related to motors for power tools.

BACKGROUND

Fastening tools, such as nailers, are used in the construction trades. Cordless nailers provide the ease of a power assisted tool with the convenience of cordless operation. Conventionally, cordless tools have been driven by Permanent Magnet (PM) brushed motors that receive DC power from a battery assembly or converted AC power. In a PM brushed motor, commutation is achieved mechanically via a commutator and a brush system.

As modern trends in the power tool industry have moved to using brushless DC motors instead of brushed motors, design engineers have faced challenges to utilize brushless DC motors with the specific tool requirements and characteristics. The main difference between a brushed motor and a brushless DC motor is that in a brushless DC motor, commutation is achieved electronically by controlling the flow of current to the stator windings.

Specifically, a brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or Delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

SUMMARY

According to an aspect of this disclosure, a power tool is providing including a housing, an input unit (e.g., a trigger switch and a contact trip sensor) actuated in response to an operator input (i.e., user's engagement of the trigger switch and contact of the nose piece with the workpiece); and a motor assembly including a motor housed within the tool housing. The power tool is also provided with a control unit that includes a controller programmable to control an operation of the motor and a decoder circuit configured to control a supply of power from a power source to the controller based on a status of the power source and a status of the input unit. The decoder circuit connects supply of power from the power source to the controller when the power tool is coupled to the power source prior to an engagement of the input unit, but disconnects the supply of power when the power tool is coupled to the power source after the engagement of the input unit. In an embodiment, the power tool is a fastening tool such as a frame nailer.

In an embodiment, the decoder circuit is configured to supply power to the controller when the power source is connected to the power tool prior to engagement of either the trigger switch or the contact trip sensor.

In an embodiment, the decoder circuit includes a 3×8 demultiplexer circuit (i.e., decoder) that outputs a feedback signal from several output terminals to an input terminal. The feedback signal may be utilized to determine whether the power source was connected to the power tool before or after the engagement of the input unit. In an embodiment, the feedback signal controls a first switch to interrupt the supply of power to the controller. In a further embodiment, a signal from the input unit controls a second switch and an output terminal of the second switch is coupled with the feedback signal to control the first switch. In a further embodiment, an output terminal of the first switch controls a third power switch to discontinue the supply of power to the controller.

According to another aspect of the disclosure, a power tool is provided including a tool housing; an input unit (e.g., a trigger switch and a contact trip sensor) actuated in response to an operator input (i.e., user's engagement of the trigger switch and contact of the nose piece with the workpiece), a motor assembly including an electric motor housed within the tool housing, and a power source. A plurality of high-side and low-side switches are connected in series between terminals of the power source and coupled to the motor terminals. A bootstrap circuit is provided including bootstrap capacitors arranged to provide sufficient amount of drive voltage to turn ON and OFF the plurality of high-side switches. A control unit is configured to turn ON and OFF the plurality of low-side switches in succession to sequentially charge the bootstrap capacitors.

In an embodiment, high-side and low-side gate drivers are provided respectively inputting the drive voltage from the bootstrap capacitors to gates of the high-side and low-side switches. In an embodiment, the control unit is further configured to control the motor by turning the plurality of switches ON or OFF through the plurality of gate driver.

In an embodiment, the bootstrap circuit further includes bootstrap diodes arranged in series with the bootstrap capacitors. In an embodiment, the bootstrap circuit further includes a resistor arranged in series with the bootstrap capacitors. In an embodiment, the switches are N-type MOSFETs.

In an embodiment, the controller is configured to turn ON and OFF each of the low-side switches for a predetermined period of time. The controller may repeat sequential charging of the bootstrap capacitors for a predetermined number of times. Alternatively or additionally, the controller may repeat sequential charging of the bootstrap capacitors until the bootstrap capacitors reach a predetermined level of charge.

In an embodiment, the electric motor is a brushless DC motor and the power source is a rechargeable battery.

According to an embodiment, an electric circuit is provided including high-side and low-side switches connected in series between terminals of a power source and coupled to a load; a bootstrap circuit including bootstrap capacitors arranged to provide sufficient amount of drive voltage to turn ON and OFF the plurality of high-side switches; and a control unit configured to turn ON and OFF the plurality of low-side switches in succession to sequentially charge the bootstrap capacitors. The electric circuit may include the features discussed above.

According to another aspect of the invention, a power tool is provided including a tool housing, a motor assembly including an electric motor housed within the tool housing, a power source, and a trigger switch embedded in a handle of the tool housing and engagable by a user to control a supply of power from the power source to the motor assembly. The power tool further includes a locking mechanism engageable by a user to mechanically block the trigger switch from being depressed in a locked position, the locking mechanism also being coupled to a power switch to simultaneously cut off flow of current from the power source to the motor assembly in the locked position.

BRIEF DESCRIPTION OF THE DRAWINGS

The present invention will become more fully understood from the detailed description and the accompanying drawings, wherein:

FIG. 6A is a timing diagram of the motor operation according to an embodiment of the invention.

DESCRIPTION

Figure 1:
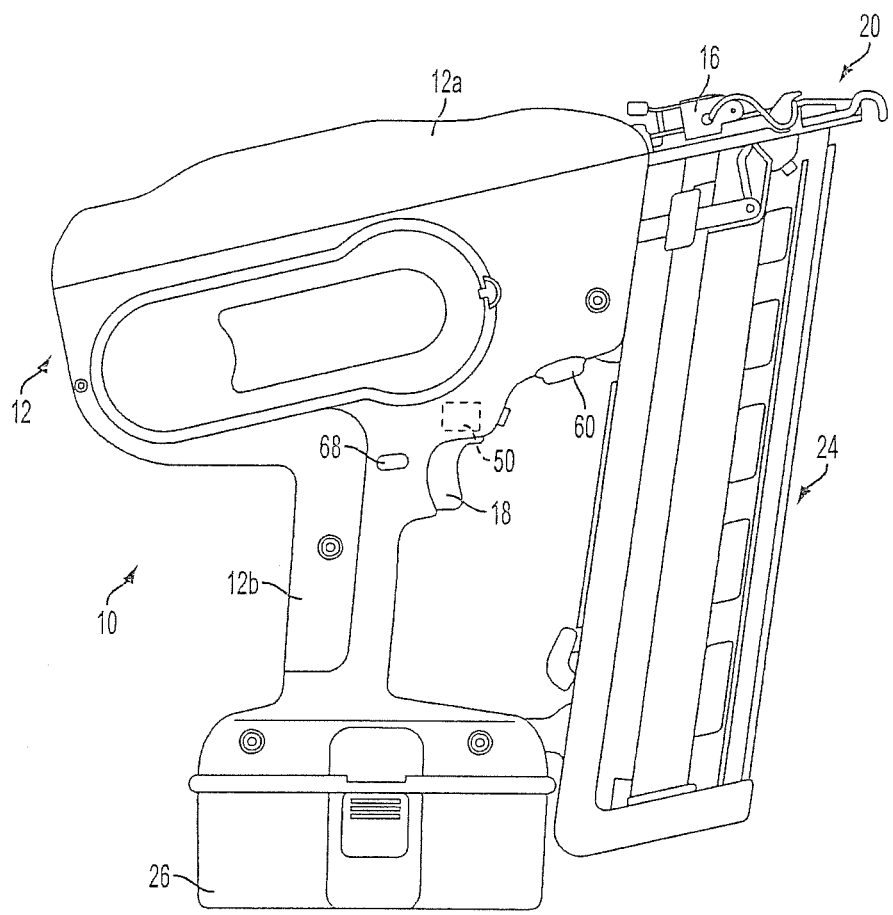
FIG. 1 is a side view of a fastening tool constructed in accordance with the teachings of the present invention.

With initial reference to FIG. 1, an electric fastener delivery device, which may be referred to herein as a nailer, is generally indicated by reference numeral 10. While the electric fastener delivery device is generally described in terms of a fastening tool 10 that drives nails into a workpiece, the electric fastener delivery device may be configured to deliver different fasteners, such as a staple or screw, or combinations of one or more of the different fasteners. Further, while the fastening tool 10 is generally described as an electric nailer, many of the features of the fastening tool 10 described below may be implemented in a pneumatic nailer or other devices, including rotary hammers, hole forming tools, such as punches, and riveting tools, such as those that are employed to install deformation rivets.

With continuing reference to FIG. 1 and additional reference to FIGS. 2 and 3, the fastening tool 10 may include a housing 12, a motor assembly 14, a nosepiece 16, a trigger 18, a contact trip 20, a control unit 22, a magazine 24, and a battery 26, which provides electrical power to the various sensors (which are discussed in detail, below) as well as the motor assembly 14 and the control unit 22. Those skilled in the art will appreciate from this disclosure, however, that in place of, or in addition to the battery 26, the fastening tool 10 may include an external power cord (not shown) for connection to an external power supply (not shown) and/or an external hose or other hardware (not shown) for connection to a source of fluid pressure.

The housing 12 may include a body portion 12a, which may be configured to house the motor assembly 14 and the control unit 22, and a handle 12b. The handle 12b may provide the housing 12 with a conventional pistol-grip appearance and may be unitarily formed with the body portion 12a or may be a discrete fabrication that is coupled to the body portion 12a, as by threaded fasteners (not shown). The handle 12b may be contoured so as to ergonomically fit a user's hand and/or may be equipped with a resilient and/or non-slip covering, such as an overmolded thermoplastic elastomer.

Figure 2:
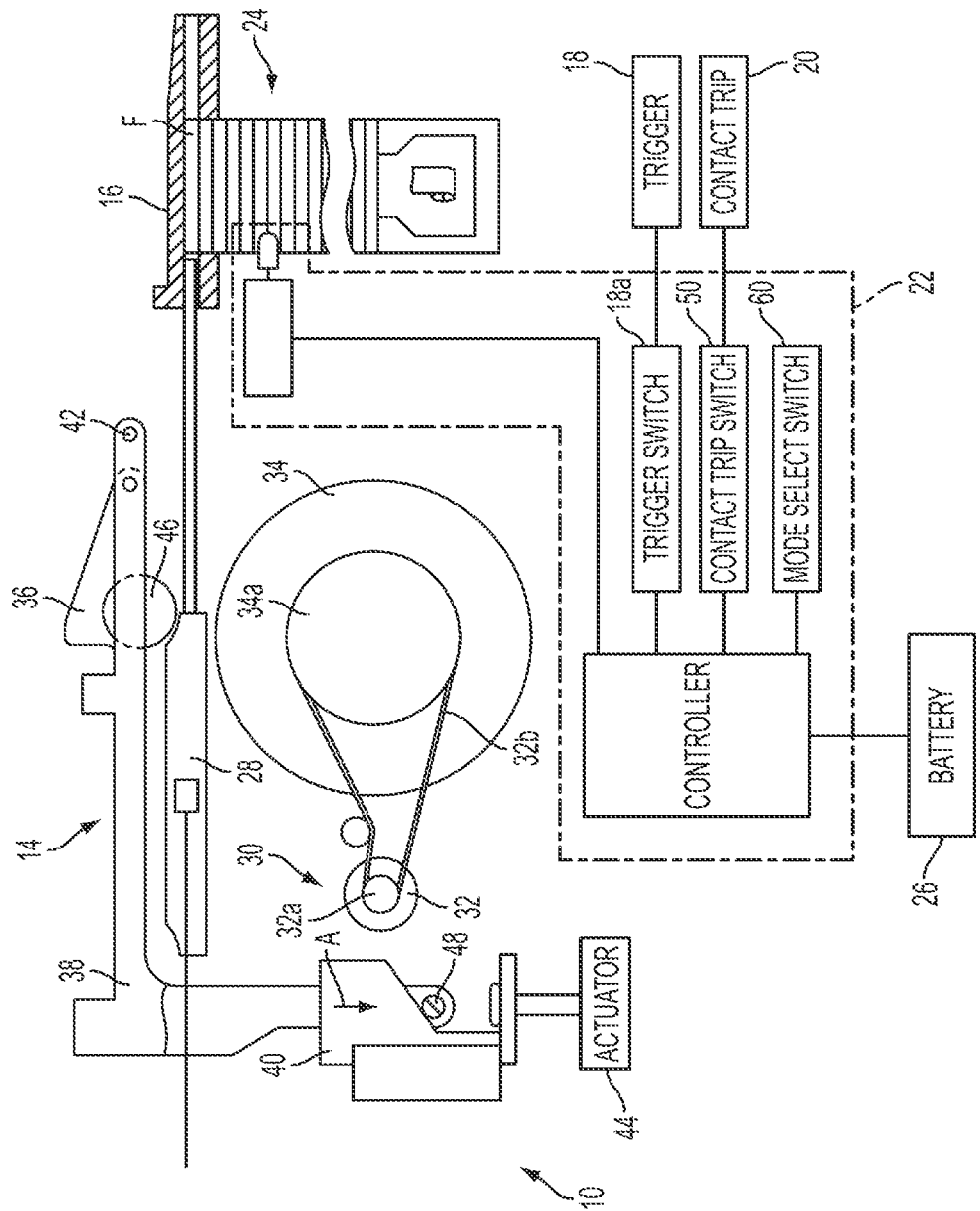
FIG. 2 is a schematic view of a portion of the fastening tool of FIG. 1 illustrating various components including the motor assembly and the control unit.

Referring to FIG. 2, the motor assembly 14 may include a driver 28 and a power source 30 that is configured to selectively transmit power to the driver 28 to cause the driver 28 to translate along an axis. In the particular example provided, the power source 30 includes an electric motor 32, a flywheel 34, which is coupled to an output shaft 32a of the electric motor 32, and a pinch roller assembly 36. The pinch roller assembly 36 may include an activation arm 38, a cam 40, a pivot pin 42, an actuator 44, a pinch roller 46 and a cam follower 48.

A detailed discussion of the motor assembly 14 that is employed in this example is beyond the scope of this disclosure and is discussed in more detail in commonly assigned U.S. Patent Publication No. 2005/0218184 A1 entitled "Structural Backbone/Motor Mount for a Power Tool", filed Mar. 31, 2005, which is hereby incorporated by reference in its entirety. Briefly, the motor 32 may be operable for rotating the flywheel 34 (e.g., via a motor pulley 32a, a belt 32b and a flywheel pulley 34a). The motor 32 may be brushless or brushed. The actuator 44 may be operable for translating the cam 40 (e.g., in the direction of arrow A) so that the cam 40 and the cam follower 48 cooperate to rotate the activation arm 38 about the pivot pin 42 so that the pinch roller 46 may drive the driver 28 into engagement with the rotating flywheel 34. Engagement of the driver 28 to the flywheel 34 permits the flywheel 34 to transfer energy to the driver 28 which propels the driver 28 toward the nosepiece 16 along the axis.

A detailed discussion of the nosepiece 16, contact trip 20 and the magazine 24 that are employed in this example is beyond the scope of this disclosure and are discussed in more detail in U.S. Pat. No. 7,641,089 entitled "Magazine Assembly for Nailer", which is being incorporated by reference herein in its entirety. The nosepiece 16 may extend from the body portion 12a proximate the magazine 24 and may be conventionally configured to engage the magazine 24 so as to sequentially receive fasteners F therefrom. The nosepiece 16 may also serve in a conventional manner to guide the driver 28 and fastener F when the fastening tool 10 has been actuated to install the fastener F to a workpiece.

The trigger 18 may be coupled to the housing 12 and is configured to receive an input from the user, typically by way of the user's finger, which may be employed in conjunction with a trigger switch 18a to generate a trigger signal that may be employed in whole or in part to initiate the cycling of the fastening tool 10 to install a fastener F to a workpiece (not shown).

The contact trip 20 may be coupled to the nosepiece 16 for sliding movement thereon. The contact trip 20 is configured to slide rearwardly in response to contact with a workpiece and may interact either with the trigger 18 or a contact trip sensor 50. In the former case, the contact trip 20 cooperates with the trigger 18 to permit the trigger 18 to actuate the trigger switch 18a to generate the trigger signal. More specifically, the trigger 18 may include a primary trigger, which is actuated by a finger of the user, and a secondary trigger, which is actuated by sufficient rearward movement of the contact trip 20. Actuation of either one of the primary and secondary triggers will not, in and of itself, cause the trigger switch 18a to generate the trigger signal. Rather, both the primary and the secondary trigger must be placed in an actuated condition to cause the trigger 18 to generate the trigger signal.

In the latter case (i.e., where the contact trip 20 interacts with the contact trip sensor 50), which is employed in the example provided, rearward movement of the contact trip 20 by a sufficient amount causes the contact trip sensor 50 to generate a contact trip signal which may be employed in conjunction with the trigger signal to initiate the cycling of the fastening tool 10 to install a fastener F to a workpiece.

An alternative embodiment of the nosepiece 16 and the magazine 24 is discussed in commonly-assigned co-pending application Ser. No. 13/485,007 filed May 31, 2012, which is also incorporated herein by reference in its entirety.

Figure 3:
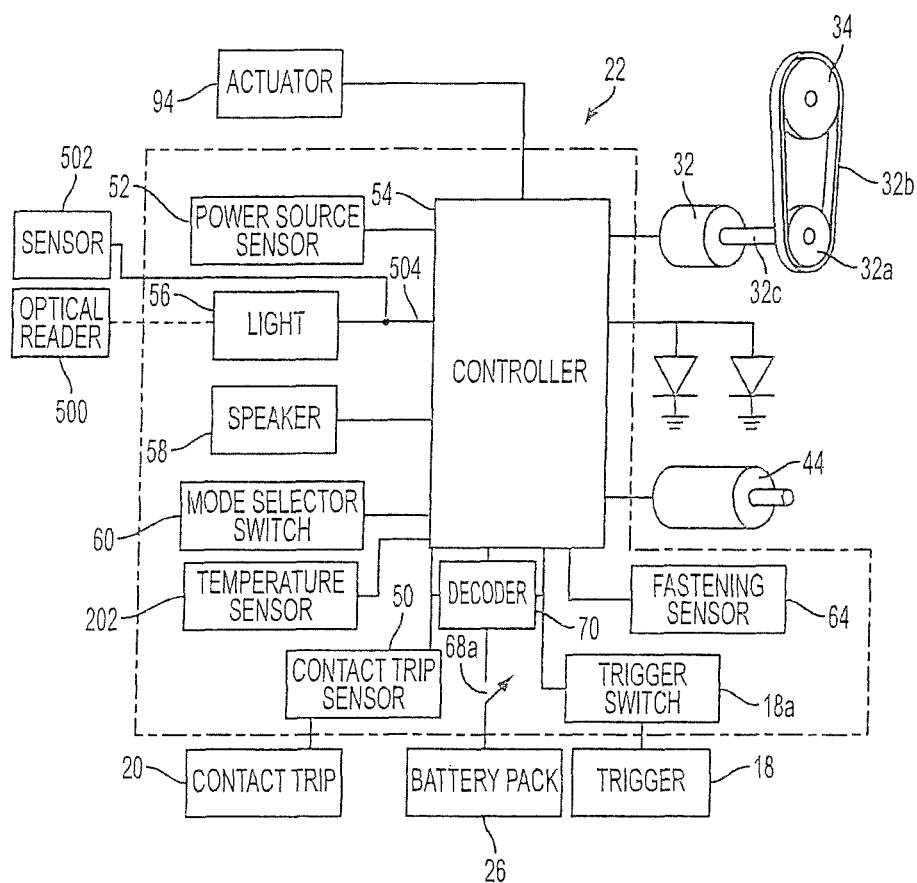
FIG. 3 is a schematic view of a portion of the fastening tool of FIG. 1, illustrating the control unit in greater detail.

Referring to FIG. 3, the control unit 22 may include a power source sensor 52, a controller 54, an indicator member, such as a light 56 and/or a speaker 58, and a mode selector switch 60. The power source sensor 52 is configured to sense a condition in the power source 30 that is indicative of a level of kinetic energy of an element in the power source 30 and to generate a sensor signal in response thereto. For example, the power source sensor 52 may be operable for sensing a speed of the output shaft 32a of the motor 32 or of the flywheel 34. As one of ordinary skill in the art would appreciate from this disclosure, the power source sensor 52 may sense the characteristic directly or indirectly. For example, the speed of the motor output shaft 32a or flywheel 34 may be sensed directly, as through encoders, eddy current sensors or Hall effect sensors, or indirectly, as through the back electromotive force of the motor 32. In the particular example provided, we employed back electromotive force, which is produced when the motor 32 is not powered by the battery 26 but rather driven by the speed and inertia of the components of the motor assembly 14 (especially the flywheel 34 in the example provided).

The mode selector switch 60 may be a switch that produces a mode selector switch signal that is indicative of a desired mode of operation of the fastening tool 10. One mode of operation may be, for example, a sequential fire mode wherein the contact trip 20 must first be abutted against a workpiece (so that the contact trip sensor 50 generates the contact trip sensor signal) and thereafter the trigger switch 18a is actuated to generate the trigger signal. Another mode of operation may be a mandatory bump feed mode wherein the trigger switch 18a is first actuated to generate the trigger signal and thereafter the contact trip 20 abutted against a workpiece so that the contact trip sensor 50 generates the contact trip sensor signal. Yet another mode of operation may be a combination mode that permits either sequential fire or bump feed wherein no particular sequence is required (i.e., the trigger sensor signal and the contact trip sensor signal may be made in either order or simultaneously). In the particular example provided, the mode selector switch 60 is a two-position switch that permits the user to select either the sequential fire mode or the combination mode that permits the user to operate the fastening tool 10 in either a sequential fire or bump feed manner.

With additional reference to FIG. 3, the control unit 22 may include a temperature sensor 202 for sensing a temperature of the motor 32 or another portion of the fastening tool, such as the controller 54. The temperature sensor 202 may be used, for example, to permit the controller 54 to compensate for differences in the back-emf (electro-magnetic field) of the motor 32 that occur with changes in temperature. In the particular example provided, the temperature sensor 202 is coupled to the controller 54 and generates a temperature signal in response to a sensed temperature of the controller 54. As the controller 54 is in relatively close proximity to the motor 32, the temperature of the controller 54 approximates the temperature of the motor 32.

The lights 56 of the fastening tool may employ any type of lamp, including light emitting diodes (LEDs) may be employed to illuminate portions of the worksite, which may be limited to or extend beyond the workpiece, and/or communicate information to the user or a device (e.g., data terminal). Each light 56 may include one or more lamps, and the lamps may be of any color, such as white, amber or red, so as to illuminate the workpiece or provide a visual signal to the operator. Where the lights 56 are to be employed to illuminate the worksite, the one or more of the lights 56 may be actuated by a discrete switch (not shown) or by the controller 54 upon the occurrence of a predetermined condition, such the actuation of the trigger switch 18a. The lights 56 may be further deactivated by switching the state of a discrete switch or by the controller 54 upon the occurrence of a predetermined condition, such as the elapsing of a predetermined amount of time.

Where the lights 56 are to be employed to communicate information, the light(s) 56 may be actuated by the controller 54 in response to the occurrence of a predetermined condition. For example, the lights 56 may flash a predetermined number of times, e.g., four times, or in a predetermined pattern in response to the determination that a charge level of the battery 26 has fallen to a predetermined level or if the controller 54 determines that a fastener has jammed in the nosepiece 16. This latter condition may be determined, for example, through back-emf sensing of the motor 32.

Additionally or alternatively, the light(s) 56 may be employed to transmit information optically or electrically to a reader. In one embodiment, light generated by the light(s) 56 is received by an optical reader 500 to permit tool data, such as the total number of cycles operated, the type and frequency of any faults that may have occurred, the values presently assigned to various adjustable parameters, etc. to be downloaded from the fastening tool 10. In another embodiment, a sensor 502 is coupled to a circuit 504 in the fastening tool 10 to which the light(s) 56 are coupled. The sensor 502 may be operable for sensing the current that passes through the light(s) 56 and/or the voltage on a leg of the circuit 504 that is coupled to the light(s) 56. As the illumination of the light(s) 56 entails both a change in the amount of current passing therethrough and a change in the voltage on the leg of the circuit 504 that is coupled to the light(s) 56, selective illumination of the light(s) 56 may be employed to cause a change in the current and/or voltage that may be sensed by the sensor 502. A signal produced by the sensor 502 in response to the changes in the current and/or voltage may be received by a reader that receives the signal that is produced by the sensor 502. Accordingly, those of ordinary skill in the art will appreciate from this disclosure that the operation light(s) 56 may be employed to affect an electric characteristic, such as current draw or voltage, that may be sensed by the sensor 502 and employed by a reader to transmit data from the tool 10.

In a conventional frame nailer, the controller 54 is continuously powered by the battery pack 44 to monitor the status of the trigger switch 18a and the contact trip sensor 50. This arrangement consumes too much battery power. In order to minimize the leakage current through the controller 54 when the trigger switch 18a and the contact trip 20 are not engaged, according to an aspect of the invention, an improvement control unit 22 may be further provided with a logic decoder circuit 70 connected to the controller 54. The decoder 70 receives inputs from the trigger switch 18a and the contact trip sensor 50. The decoder circuit 70 also receives a battery status signal from the battery pack 26. If the battery status is at a satisfactory level, e.g., above 5V, and based on inputs received from the trigger switch 18a and the contact trip sensor 50, the decoder circuit 70 enables supply of battery power to the controller 54.

Figure 4A:
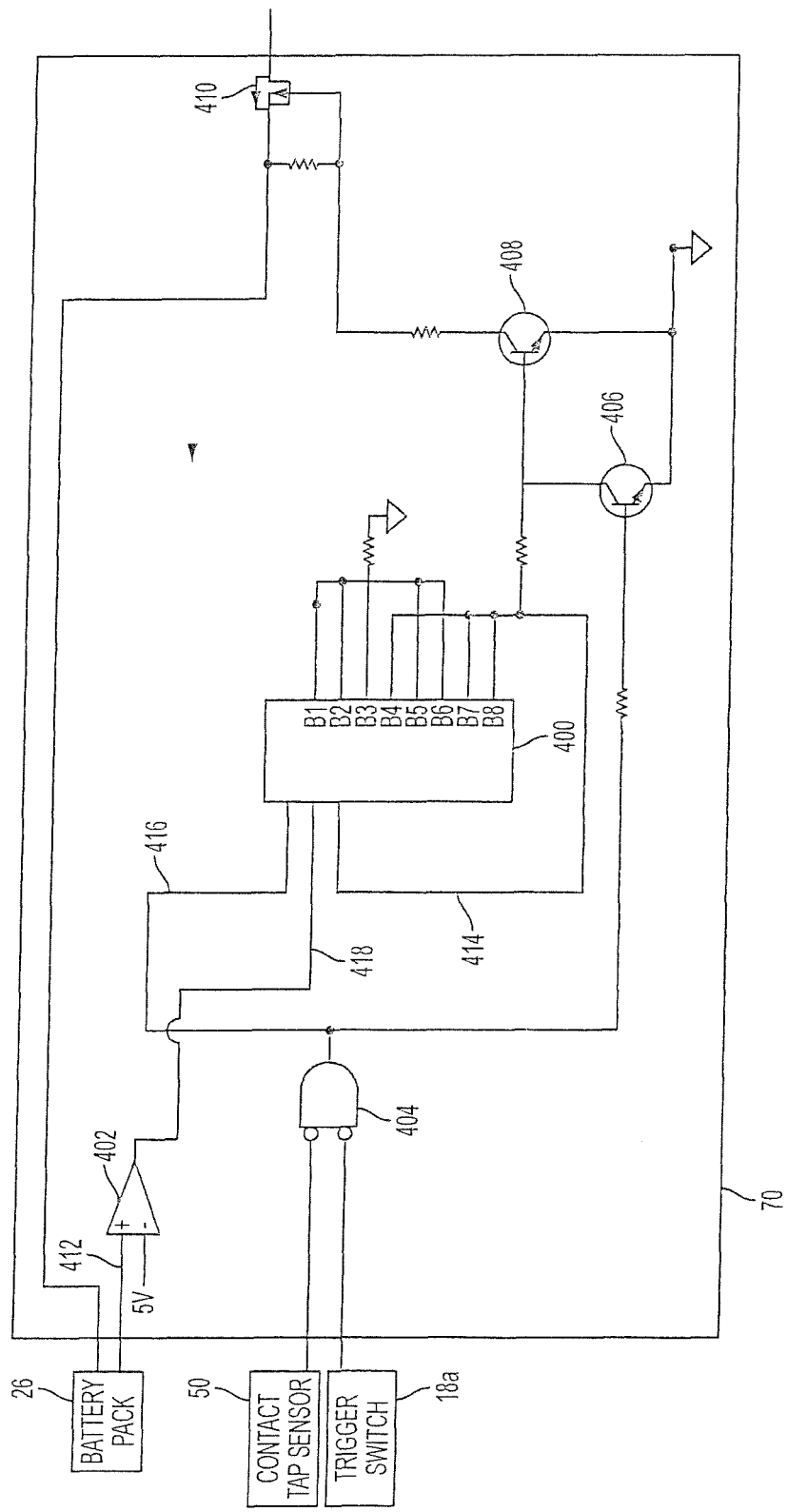
FIG. 4A is a schematic view of a decoder circuit according to an embodiment of the invention.

FIG. 4A depicts an exemplary embodiment of the decoder circuit 70 within the control unit 22. The decoder circuit 70 in this embodiment includes a decoder unit 400 that receives an input from a comparator 402. The comparator 402, which may be an operational amplifier, receives a battery status signal 412 from the battery pack 26 as input and compares the battery status signal to a predetermined threshold, e.g., 5V. The battery status signal 412 indicates whether the battery is property connected to the tool and is sufficiently charged. If the battery status signal is above the predetermined threshold, indicating that the battery status is acceptable, the comparator 402 provides a logic '1' signal 418 to the decoder unit 400.

The decoder unit 400 further receives a logic signal 416 from an AND gate 404, which is coupled to active-low outputs of the contact trip sensor 50 and the trigger switch 18a. Alternatively, the AND gate 404 may be provided as a NOR gate coupled directly to the outputs of the contact trip sensor 50 and the trigger switch 18a. The signal 416 received form the AND gate 404 is logic high only when neither the contact trip sensor 50 nor the trigger switch 18a have been engaged. The decoder unit also receives a feedback signal 414, as described further below. Using the feedback signal 414, the AND signal 416, and the battery status signal 418, as described below, the decoder unit 400 determines whether power should be provided to the controller 54 from the battery pack 26. The decoder unit 400 accomplishes this via switches 406 and 408, in this case bipolar junction transistors, which are connected to the gate of a field effect transistor 410 that disrupts the supply of power from the battery pack 26.

The truth Table 1 below embodies the operation of the decoder 70 according to an exemplary embodiment.

TABLE 1

| State | Feedback | Battery Status | Switch Status (Signal 416) | Decoder Unit 400 Output | Power Condition (Decoder 70 Output) |
|---|---|---|---|---|---|
| 1 | 0 | 0 | 0 | B1 = 0 | OFF |
| 2 | 0 | 0 | 1 | B2 = 0 | OFF |
| 3 | 0 | 1 | 0 | B3 = 0 | OFF |
| 4 | 0 | 1 | 1 | B4 = 1 | OFF |
| 5 | 1 | 0 | 0 | B5 = 0 | OFF |
| 6 | 1 | 0 | 1 | B6 = 0 | OFF |
| 7 | 1 | 1 | 0 | B7 = 1 | ON |
| 8 | 1 | 1 | 1 | B8 = 1 | OFF |

State 2 represents the initial state of the decoder 70 before the battery pack 26 is inserted into the tool and the trigger switch 18a and contact trip sensor 50 are engaged. Once the battery pack is inserted, the decoder 70 state transitions from state 2 to state 4 (where the feedback signal is activated), and on to state 8. In state 8, although the feedback signal 414 is high, the AND signal 416 is low, which grounds the gate of the transistor 408 via the transistor 406. In this state, the decoder 70 is ready to transition to state 7 to power on the controller 54 once either the trigger switch 18a or the contact trip sensor 50 have been engaged.

It is possible for the battery pack 26 to be inserted into the tool while one of the trigger switch 18a or contact trip sensor 50 have been engaged. In this condition, the tool must ensure that the controller 54 does not power the motor. In this case, the tool decoder 70 transitions from state 2 to state 1, where it will remain until both the trigger switch 18a and the contact trip sensor 50 have been disengaged. The presence of the feedback signal 414 ensures that such condition does not trigger power input to the controller 54. In other words, the presence of the feedback signal 414 ensures that the controller 54 is powered when the battery pack 26 is connected to the power tool followed by engagement of one of the trigger switch 18a or contact trip sensor 50, but not when the trigger switch 18a or contact trip sensor 50 has been engaged before the battery pack 26 has been attached to the power tool.

Figure 4B:
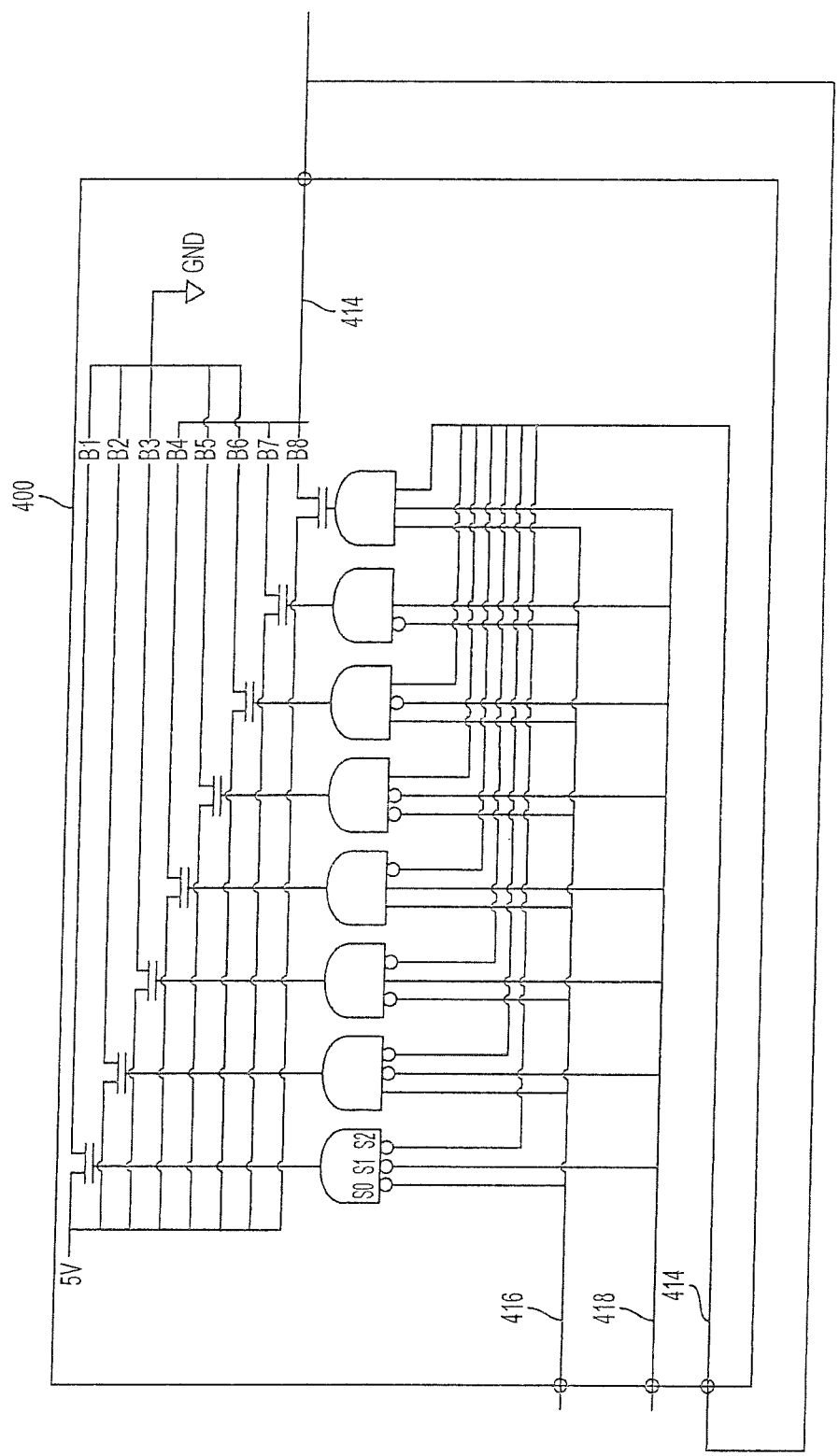
FIG. 4B is a schematic view of the decoder in greater detail.

FIG. 4B depicts a perspective view of the decoder unit 400, according to an exemplary embodiment. The decoder unit 400 may be, for example, an off-the-shelf 3×8 demultiplexer integrated circuit unit.

According to an aspect of the invention, a bootstrap circuit is provided for driving high side gate drivers in a power tool. As previously discussed, the electric motor 32 may be a brushless DC motor (BLDC). The operation of a BLDC motor is outside the scope of this disclosure and is not discussed in great detail herein. In summary, in a conventional brushed motor, armature windings are provided inside a wound or permanent magnet stator. The armature windings are in contact with a set of brushes that reverse the direction of the current through the armature windings, thus causing the armature windings to rotate inside the stator. In contrast to brushed motors, a BLDC motor is typically provided with a permanent magnet rotor and electrically-commutated stator windings. The stator windings are commutated via a micro-controller—in this case the controller 54—which reverses the current through the stator windings periodically, causing the rotator to rotate inside the stator. Commutation of the stator windings take place base on the position of rotor as detected by Hall Effect sensors.

In a three-phase BLDC motor, which is very common particularly for power tool applications, the micro-controller controls the flow of current to the stator windings via a series of Field Effect Transistors (FETs). In the configuration shown in FIG. 5A, which depicts a conventional system for coupling the controller 54 to the motor 32, three high-side FETs 510, 512, 514 are provided to selectively connect the supply of VCC power from the battery pack 26 to the motor 32. Also, three low-side FETs 520, 522, 524 are provided to selectively connect the motor 32 to the ground when the battery pack 26 power is cut off via a corresponding high-side FET. Since the controller 54 provides logic ON/OFF signal outputs, a high-side gate driver 530 and a low-side gate driver 540 is additionally provided. The gate drivers 530 and 540 translate the logic ON/OFF signals from the controller 54 into power signals necessary to controls the FETs. Specifically, the high-side gate driver 530 receives inputs IN(WH), IN(VH), and IN(UH) corresponding to the three motor windings W, V and U from the controller 54 and outputs OUT(WH), OUT(VH), and OUT(UH) to the gates of the high-side FETs 510, 512, and 514, respectively. Similarly, the low-side gate driver 540 receives inputs IN(WL), IN(VL), and IN(UL) corresponding to the three motor windings W, V and U from the controller 54 and outputs OUT(WL), OUT(VL), and OUT(UL) to the gates of the low-side FETs 520, 522, and 524, respectively. The source of each high-side FETs 510, 512, 514 is coupled to the drain of a corresponding low-side FET 520, 522, 524. The controller 54 is configured such that any time one of the signals OUT(WH), OUT(VH), OUT(UH) is driven high, the corresponding signal OUT(WL), OUT(VL), OUT(UL) is driven low, and vice versa. This ensures that the Vs signal coupled to the motor 32 is not floating.

The FETs described above are typically N-type Metal Oxide Semiconductor Field Effect Transistors (MOSFETs). N-type MOSFETs are utilized for both high-side and low-side FETs because they take up substantially less space and are less expensive than comparable P-type MOSFETs. However, using n-type MOSFETs in place of p-type MOSFETs requires application of a voltage substantially higher than the battery pack 26 power supply (V+) at the gate in order to saturate the transistors and switch the transistors from a conducting state to a non-conducting state and vice versa. In order to meet the high-voltage requirement of the high-side FETS, a bootstrap circuit is used.

Figure 5A:
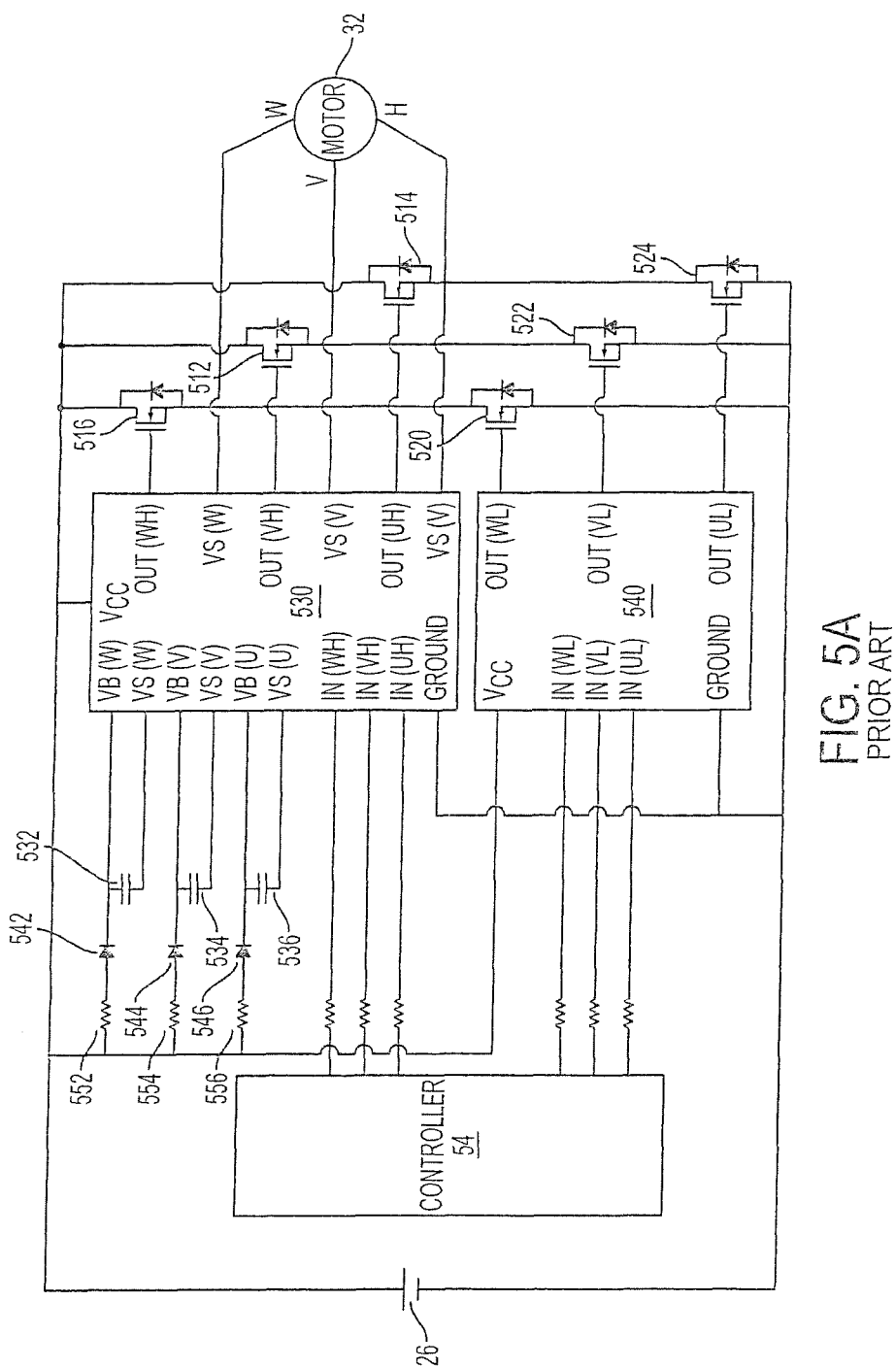
FIG. 5A is a schematic view of a prior art bootstrap circuit.

In conventional bootstrap circuits, as shown in FIG. 5A, a series of bootstrap capacitors 532, 534, 536 is coupled to the terminals of the high side gate driver 530. The bootstrap capacitors 532, 534, 536 are connected between the corresponding VS and VB input terminals of the high-side gate driver 530. The diodes 541, 544, 546 and resisters 552, 554, 556 are arranged between Vcc from the battery pack 26 and the bootstrap capacitors 532, 534, 536. The bootstrap capacitors 532, 534, 536 are charged by turning off the high-side FETs 510, 512, 514 and turning on the low-side FETs 520, 522, 524. This allows for the potential different between the VS(W), VS(V), VS(U) lines, which are connected through the low-side FETs 520, 522, 524 to the ground, and the resistors 552, 554, 556, which are connected to Vcc, to charge the bootstrap capacitors 532, 534, 536. When the controller 54 activates any of IN(WH), IN(VH), and/or IN(UH) signals to turn on a corresponding high-side FET 510, 512, 514, the corresponding bootstrap capacitor 532, 534, 536 provides the required current to the gate driver 530 to drive the high-side FET.

The above-described bootstrap system has certain disadvantages in power tool applications. Specifically, the addition of bootstrap capacitors, resistors, and diodes takes up too much space to the motor control unit. Since the trend in the industry is to move towards lighter and smaller power tools, any reduction in the number of components used within the bootstrap circuit is desirable. More importantly, in cordless power tools such as the cordless fastening tool described in this application, charging three bootstrap capacitors simultaneously using the battery pack 26 places a heavy burden on the battery pack. It would therefore also be desirable to reduce the loading effect on the battery pack 26.

Figure 5B:
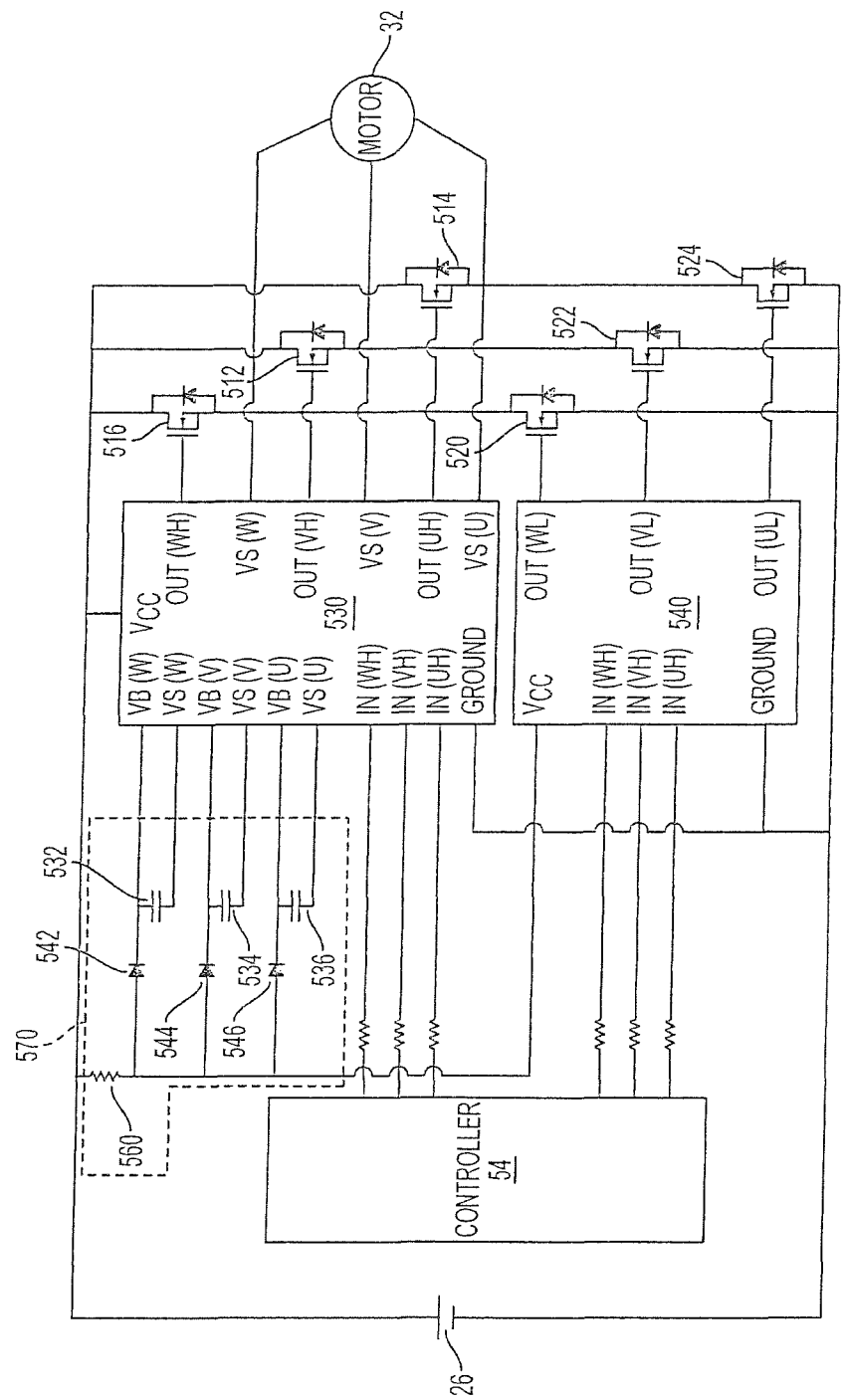
FIG. 5B is a schematic view of a bootstrap circuit according to an embodiment of the invention.

In order to achieve these and other objections, according to an aspect of the invention as shown in FIG. 5B, an improved bootstrap circuit 570 is provided. The bootstrap circuit includes a single resister 560 attached in series with the diodes 542, 544, 546. In contrast to the conventional bootstrap circuit of FIG. 5A where all capacitors are charged simultaneously, the bootstrap capacitors 532, 534, 536 of the bootstrap circuit 570 in this arrangement is configured to sequentially turn the turn ON and OFF the low-side FETs 520, 522, 524 one at a time. In an embodiment, each I low-side FET 520, 522, 524 is turned ON for a predetermined period of time. This sequence may be continued several times until each of the bootstrap capacitors 532, 534, 536 of the bootstrap circuit 570 are sufficiently charged. This arrangement reduces the size of the bootstrap circuit 570 as well as the load on the battery pack 26.

According to an embodiment, the controller 54 is configured to monitor the charge level of the bootstrap capacitors 532, 534, 536 and continue the charging cycle until the capacitors are fully charged. Alternatively, the controller 54 may be pre-programmed to repeat the cycle a predetermined number of times.

According to another aspect of the invention, a Pulse Width Modulation (PWM) duty cycle generation method is described herein. In a cordless fastening tool, as described above with reference to FIGS. 1 and 2, the motor 32 includes an output shaft (not shown) with a pulley 32a coupled thereto for driving the flywheel 34. The actuator 44 may be operable for translating the cam 40 so that the cam 40 and the cam follower 48 cooperate to rotate the activation arm 38 about the pivot pin 42 so that the pinch roller 46 may drive the driver 28 into engagement with the rotating flywheel 34. The actuator 44 may be a solenoid in an exemplary embodiment. Engagement of the driver 28 to the flywheel 34 permits the flywheel 34 to transfer energy to the driver 28 which propels the driver 28 toward the nosepiece 16 along the axis. The motor 32 has to reach a target speed necessary to provide sufficient energy to the flywheel 34 to propel the driver 28.

FIG. 6A shows the timing diagram of the speed of the motor 32 during the operation of the fastening tool, according to an exemplary embodiment. As can be seen in this figure, the motor speed has to reach a target speed in order for the flywheel 34 to drive the actuator 44 when both the contact trip sensor 50 and the trigger switch 18a have been triggered. The controller 54 is configured to increase the PWM duty cycle of the motor 32 until that target speed (i.e., target RPM) has been reached. Once the target RPM has been reached, the controller 54 fires the actuator 44 if both the contact trip sensor 50 and the trigger switch 18a have been triggered. Each time the actuator 44 is fired to drive the driver 28, the speed of the motor is dropped during the motor coast phase. At that point, the controller 54 adjusts the PWM duty cycle of the motor 32 to reach the target RPM once again. Furthermore, in order to prevent double-firing of the actuator 44 when the contact trip sensor 50 and the trigger switch 18a are triggered for an extended amount of time while the motor is at target RPM (e.g., between times $t_3$ and $t_6$), the controller 54 awaits a predetermined amount of time, e.g., 200 ms, before the contact trip sensor 50 and the trigger switch 18a are sampled again.

Figure 6B:
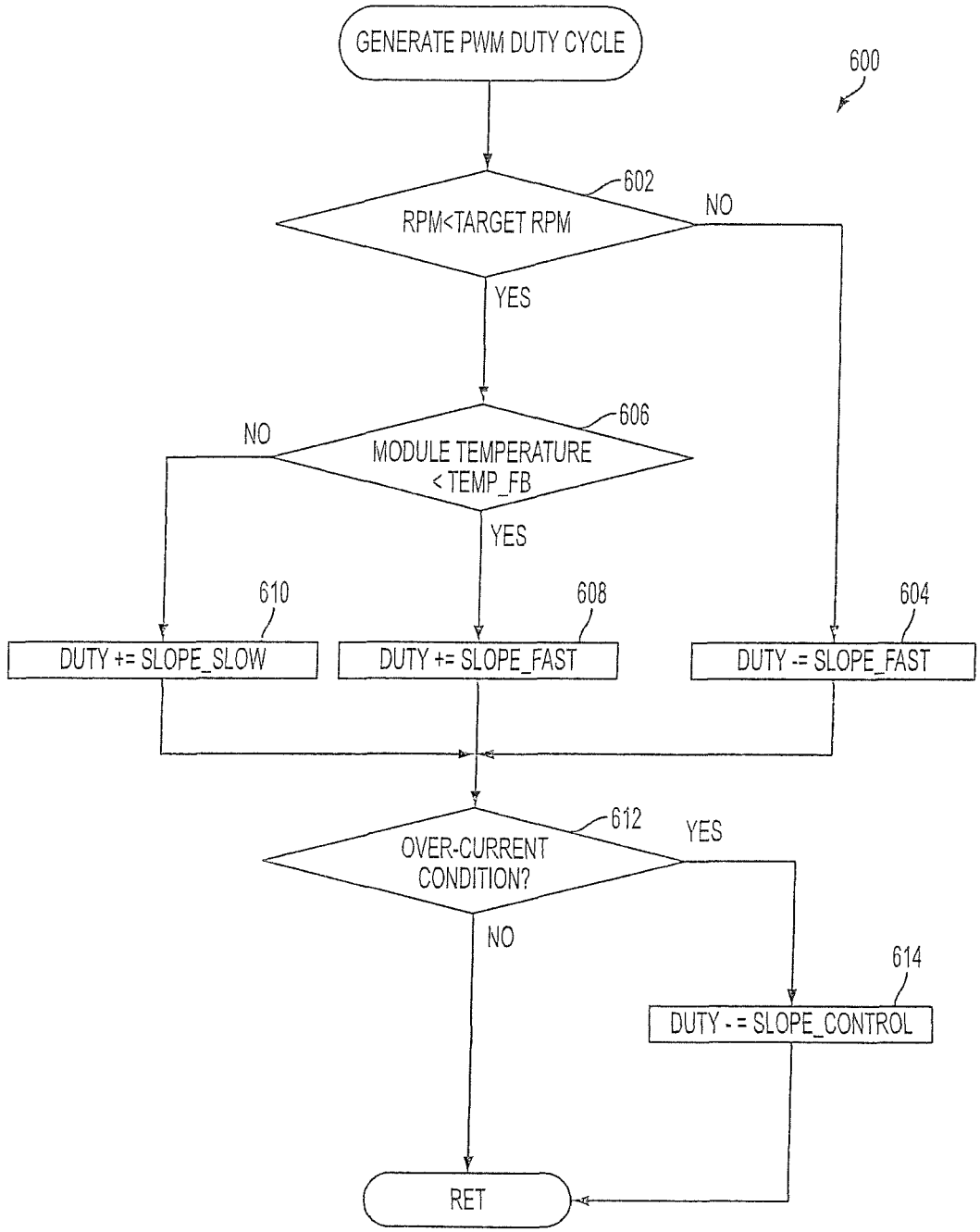
FIG. 6B is a flow diagram of the PWM duty cycle generation for the motor according to an embodiment of the invention.

FIG. 6B illustrates a flow diagram for the method 600 of generating a PWM duty cycle for the motor 32, according to an embodiment of the invention. In this embodiment, the controller 54 is configured to determine if the motor RMP is less than a predetermined target RPM at step 602. If the target RPM has been exceeded, the controller 54 reduces the PWM duty cycle of the motor 32 by a predetermined amount, i.e., SLOPE_FAST, at step 604. If the motor RMP has not yet reached the target RMP, the controller 54 increases the PWM duty cycle at step 606 depending on the module temperature. Specifically, at step 604, the controller 54 determined if the module temperature is less than a predetermined temperature threshold (i.e., TEMP_FB) using the temperature sensor 202. If so, the controller 54 increases the PWM duty cycle at a normal fast rate, i.e., by SLOPE_FAST, at step 608. This allows the motor 32 to reach its target RMP at $t_1$–$t_0$ time of, for example, 30 milliseconds. Otherwise, the controller 54 increases the PWM duty cycle at a slower rate, i.e., by SLOPE_SLOW, at step 610. This may increase $t_1-t_0$ time to, for example, 1 second. In a further embodiment, at steps 612 and 614, the controller 54 may decrease the PWM duty cycle depending on whether an over-current condition has occurred.

According to an embodiment, the controller 54 may be configured to set different temperature thresholds for different tool components. For example, the fastening tool may include a first temperature sensor near the motor or at the control unit 22, and a second temperature sensor at or near the battery pack 26. Also, the controller 54 may be configured to set different levels of temperature threshold corresponding to each tool component. For example, as shown in Table 2 below, the controller 54 may be configured to have three temperature settings: normal, foldback, and shutdown. The module temperature threshold (i.e., as sensed by the temperature sensor 202) may be set to, for example, 70° C. for normal mode. The controller 54 lien enters foldback mode at module temperature of 70° C. to 85° C., wherein the PWM duty cycle is increased by the slower rate of SLOPE_SLOW. In a further embodiment, the controller 54 may even have different foldback modes corresponding to different temperature thresholds and different SLOPE_SLOW amounts. If the module temperature increases above 85° C., the controller 54 temporary shuts down the tool.

Similarly, the battery temperature threshold may be set to, for 60° C. for normal mode, 60° C. to 65° C. for foldback mode, and over 65° C. for shutdown mode. Alternatively, as shown in Table 3, the battery temperature may include only a normal mode and a shutdown mode.

TABLE 2

| Mode | Module Temp | Battery Temp |
| --- | --- | --- |
| Normal | <70° C. | <60° C. |
| Foldback | <85° C. | <65° C. |
| Shutdown | >85° C. | >65° C. |

TABLE 3

| Mode | Module Temp | Battery Temp |
| --- | --- | --- |
| Normal | <70° C. | <65° C. |
| Foldback | <85° C. | — |
| Shutdown | >85° C. | >65° C. |

According to another aspect of the invention, an electrical/mechanical lock-out mechanism is provided. In conventional fastening tools, a purely mechanical lockout switch would be provided on or adjacent to the contact trip 20 to mechanically prevent the contact trip 20 from being depressed. This design has several disadvantages in that, even if the tool is locked, pressing the trigger switch 18a still starts the motor 30. Thus, for example, if the trigger switch 18a is accidentally engaged while the tool is in a kit box, it would cause the motor 30 to start running, which of course can be very dangerous. Also, from an ergonomics standpoint, the position of the lockout switch is not always obvious to the user.

In order to overcome these disadvantages, according to an exemplary embodiment of the invention, a lock-out mechanism 68 is provided (see FIG. 1). The lock-out mechanism 68 may be, for example, an ON/OFF switch or any other switch capable of providing both mechanical and electrical lock-out capabilities. In one embodiment, the lock-out mechanism 68 may be a simple Forward/Reverse switch in which the Reverse functionality has been mechanically blocked via a rib on the tool housing. In the locked position, the lock-out mechanism 68 mechanically prevents the trigger 18 from being depressed. Simultaneously, the lock-out mechanism 68 acts as an electrical switch to cut off the flow of current from the battery pack 26, as indicated by the electrical switch 68a in FIG. 3.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool comprising:
   a tool housing;
   an input unit actuated in response to an operator input;
   a motor assembly including an electric motor housed within the tool housing and having a plurality of terminals;
   a power source;
   a plurality of high-side and low-side switches connected in series between terminals of the power source and coupled to the motor terminals;
   a bootstrap circuit comprising a plurality of bootstrap capacitors arranged to provide sufficient amount of drive voltage to turn ON and OFF the plurality of high-side switches; and
   a control unit configured to turn ON and OFF the plurality of low-side switches in succession to sequentially charge the bootstrap capacitors.

2. The power tool of claim 1, further comprising a plurality of high-side and low-side gate drivers respectively inputting the drive voltage from the plurality of bootstrap capacitors to gates of the plurality of high-side and low-side switches.

3. The power tool of claim 2, wherein the control unit is further configured to control the motor by turning the plurality of switches ON or OFF through the plurality of gate driver.

4. The power tool of claim 1, wherein the bootstrap circuit further comprises a plurality of bootstrap diodes arranged in series with the plurality of bootstrap capacitors.

5. The power tool of claim 1, wherein the bootstrap circuit further comprises a resistor arranged in series with the plurality of bootstrap capacitors.

6. The power tool of claim 1, wherein the plurality of switches comprise N-type MOSFETs.

7. The power tool of claim 1, wherein the controller is configured to turn ON and OFF each of the plurality of low-side switches for a predetermined period of time.

8. The power tool of claim 1, wherein the controller is configured to repeat sequential charging of the bootstrap capacitors for a predetermined number of times.

9. The power tool of claim 1, wherein the controller is configured to repeat sequential charging of the bootstrap capacitors until the bootstrap capacitors reach a predetermined level of charge.

10. The power tool of claim 1, wherein the electric motor is a brushless DC motor and the power source is a rechargeable battery.

11. The power tool of claim 1, wherein the power tool comprises a fastening tool.

12. An electronic circuit comprising:
   a plurality of high-side and low-side switches connected in series between terminals of a power source and coupled to a load;
   a bootstrap circuit comprising a plurality of bootstrap capacitors arranged to provide sufficient amount of drive voltage to turn ON and OFF the plurality of high-side switches; and a control unit configured to turn ON and OFF the plurality of low-side switches in succession to sequentially charge the bootstrap capacitors.

13. The electronic circuit of claim 12, further comprising a plurality of high-side and low-side gate drivers respectively inputting the drive voltage from the plurality of bootstrap capacitors to gates of the plurality of high-side and low-side switches.

14. The electronic circuit of claim 12, wherein the load comprises a DC electric motor.

15. The electronic circuit of claim 12, wherein the control unit is further configured to control operation of the load by turning the plurality of switches ON or OFF through the plurality of gate driver.

16. The electronic circuit of claim 12, wherein the bootstrap circuit further comprises a plurality of bootstrap diodes arranged in series with the plurality of bootstrap capacitors.

17. The electronic circuit of claim 12, wherein the bootstrap circuit further comprises a resistor arranged in series with the plurality of bootstrap capacitors.

18. The electronic circuit of claim 12, wherein the controller is configured to turn ON and OFF each of the plurality of low-side switches for a predetermined period of time.

19. The electronic circuit of claim 12, wherein the controller is configured to repeat sequential charging of the bootstrap capacitors for a predetermined number of times.

20. The electronic circuit of claim 12, wherein the controller is configured to repeat sequential charging of the bootstrap capacitors until the bootstrap capacitors reach a predetermined level of charge.

\* \* \* \* \*